(12) United States Patent
Bishop

(10) Patent No.: US 9,842,153 B2
(45) Date of Patent: Dec. 12, 2017

(54) USAGE AND BANDWIDTH UTILIZATION COLLECTION MECHANISM FOR A DISTRIBUTED STORAGE SYSTEM

(71) Applicant: SwiftStack, Inc., San Francisco, CA (US)

(72) Inventor: Darrell Bishop, San Francisco, CA (US)

(73) Assignee: SwiftStack, Inc., San Francisco, CA (US)

(*) Notice: Subject to any disclaimer, the term of this patent is extended or adjusted under 35 U.S.C. 154(b) by 317 days.

(21) Appl. No.: 14/637,284

(22) Filed: Mar. 3, 2015

(65) Prior Publication Data
US 2016/0259834 A1    Sep. 8, 2016

(51) Int. Cl.
G06F 17/30 (2006.01)
H04L 12/26 (2006.01)
H04L 12/14 (2006.01)

(52) U.S. Cl.
CPC .. *G06F 17/30575* (2013.01); *G06F 17/30106* (2013.01); *G06F 17/30194* (2013.01); *H04L 12/14* (2013.01); *H04L 43/0876* (2013.01)

(58) Field of Classification Search
CPC ......... G06F 17/30575; G06F 17/30106; G06F 17/30194; H04L 12/14; H04L 43/0876
See application file for complete search history.

(56) References Cited

U.S. PATENT DOCUMENTS

| | | | |
|---|---|---|---|
| 5,327,556 A * | 7/1994 | Mohan | G06F 12/0815 707/695 |
| 2010/0161574 A1 * | 6/2010 | Davidson | G06F 17/30572 707/705 |

* cited by examiner

*Primary Examiner* — Jason Liao
(74) *Attorney, Agent, or Firm* — Perkins Coie LLP

(57) ABSTRACT

A technique is introduced that enables one or more mechanisms to collect storage and transfer utilization metrics for an account in a distributed data storage system that are more scalable and robust than conventional ways. The technique includes a method comprising, for each of the nodes, of collecting storage utilization data for a one account. The method further includes, for each proxy server, collecting transfer utilization data for the one account. The method further includes, at the controller, generating a cluster account interval (CAI) data based on a raw storage data file and an aggregated transfer data file. The CAI data include storage and transfer utilization data over a predetermined time span.

25 Claims, 12 Drawing Sheets

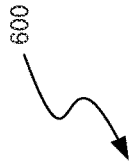

Data Set A – NTI Data Records (30 min interval)

| | | NTI (13:30-14:00) 13:30 | NTI (14:00-14:30) 14:00 | NTI (14:30-15:00) 14:30 | NTI (15:00-15:30) 15:00 | NTI (15:30-16:00) 15:30 |
|---|---|---|---|---|---|---|
| Cluster 1 | Node 1 | | NTI Storage Record 1<br>NTI Transfer Record 1 | NTI Storage Record 5<br>NTI Transfer Record 5 | NTI Storage Record 9<br>NTI Transfer Record 9 | NTI Storage Record 13<br>NTI Transfer Record 13 |
| Cluster 1 | Node 2 | | NTI Storage Record 2<br>NTI Transfer Record 2 | NTI Storage Record 6<br>NTI Transfer Record 6 | NTI Storage Record 10<br>NTI Transfer Record 10 | NTI Storage Record 14<br>NTI Transfer Record 14 |
| Cluster 2 | Node 1 | | NTI Storage Record 3<br>NTI Transfer Record 3 | NTI Storage Record 7<br>NTI Transfer Record 7 | NTI Storage Record 11<br>NTI Transfer Record 11 | NTI Storage Record 15<br>NTI Transfer Record 15 |
| Cluster 2 | Node 2 | | NTI Storage Record 4<br>NTI Transfer Record 4 | NTI Storage Record 8<br>NTI Transfer Record 8 | NTI Storage Record 12<br>NTI Transfer Record 12 | NTI Storage Record 16<br>NTI Transfer Record 16 |

FIG. 6

Data Set A –
Hourly Data Using the CAIO Interval

| | | NTI (13:30-14:00) | NTI (14:00-14:30) | NTI (14:30-15:00) | NTI (15:00-15:30) | NTI (15:30-16:00) |
|---|---|---|---|---|---|---|
| | | 13:30 | 14:00 | 14:30 | 15:00 | 15:30 |
| Cluster 1 | Node 1 | CAIO (13:30-14:30) | Storage 1 / Transfer 1 | CAIO (14:30-15:30) / Storage 5 / Transfer 5 | Storage 9 / Transfer 9 | Storage 13 / Transfer 13 |
| Cluster 1 | Node 2 | | Storage 2 / Transfer 2 | Storage 6 / Transfer 6 | Storage 10 / Transfer 10 | Storage 14 / Transfer 14 |
| Cluster 2 | Node 1 | CAIO (13:30-14:30) | Storage 3 / Transfer 3 | CAIO (14:30-15:30) / Storage 7 / Transfer 7 | Storage 11 / Transfer 11 | Storage 15 / Transfer 15 |
| Cluster 2 | Node 2 | | Storage 4 / Transfer 4 | Storage 8 / Transfer 8 | Storage 12 / Transfer 12 | Storage 16 / Transfer 16 |

Grouping of four NTIs to form one CAIO (for example)

Data Set A – Each NTI Record Contributions Only Once to One CAI and one CAIO

| | NTI (13:30-14:00) | NTI (14:00-14:30) | NTI (14:30-15:00) | NTI (15:00-15:30) | NTI (15:30-16:00) |
|---|---|---|---|---|---|
| | 13:30 | 14:00 | 14:30 | 15:00 | 15:30 |
| Cluster 1 Node 1 | | Storage 1 Transfer 1 | Storage 5 Transfer 5 | Storage 9 Transfer 9 | Storage 13 Transfer 13 |
| Cluster 1 Node 2 | | Storage 2 Transfer 2 | Storage 6 Transfer 6 | Storage 10 Transfer 10 | Storage 14 Transfer 14 |
| Cluster 2 Node 1 | | Storage 3 Transfer 3 | Storage 7 Transfer 7 | Storage 11 Transfer 11 | Storage 15 Transfer 15 |
| Cluster 2 Node 2 | | Storage 4 Transfer 4 | Storage 8 Transfer 8 | Storage 12 Transfer 12 | Storage 16 Transfer 16 |

900 — CAIO, CAI, CAIO

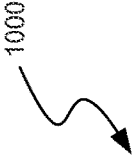

| | CAI 1 | | | | CAI 2 | | | | CAI 3 | | | |
|---|---|---|---|---|---|---|---|---|---|---|---|---|
| | 14:00 | | 15:00 | | | | 16:00 | | | |
| | NTI 1 Node Roles* | Expected NTI Count | NTI 2 Node Roles | Expected NTI Count | NTI 3 Node Roles | Expected NTI Count | NTI 4 Node Roles | Expected NTI Count | NTI 5 Node Roles | Expected NTI Count | NTI 6 Node Roles | Expected NTI Count |
| Node 1 | Proxy + A/C | 2 | Proxy + A/C | 2 | Proxy + A/C | 2 | Proxy + A/C | 2 | Proxy + A/C | 2 | Proxy + A/C | 2 |
| Node 2 | Proxy | 1 | Proxy | 1 | Proxy | 1 | Proxy | 1 | Proxy | 1 | Proxy | 1 |
| Node 3 | Proxy + A/C | 2 | Proxy + A/C | 2 | Proxy + A/C | 2 | A/C | 1 | A/C | 1 | A/C | 1 |
| Node 4 | A/C | 1 | A/C | 1 | A/C | 1 | A/C | 1 | A/C | 1 | A/C | 1 |
| Expected NTIs | | 6 | | 6 | | 6 | | 5 | | 5 | | 5 |
| Expect NTIs per CAI | | | | 12 | | | | 11 | | | | 10 |

\* Node Roles: Proxy, Account/Container (A/C)

*FIG. 10*

Time T0 for Account X

| NTI | Transfer Data (summed) | | | Storage Data (largest wins) | | | |
|---|---|---|---|---|---|---|---|
| | Bytes in | Bytes out | Requests Count | Container Count | Container Count | Byte Count | NTI Type |
| 1 | 5 | 2 | 8 | | | | Transfer |
| 2 | | | | 1 | 5 | 15 | Storage |
| 3 | 9 | 6 | 3 | | | | Transfer |
| 4 | | | | 2 | 4 | 10 | Storage |
| 5 | 0 | 8 | 1 | | | | Transfer |
| CAI #s | 14 | 16 | 12 | 2 | 5 | 15 | |

Time T1 for Account X

| NTI | Transfer Data (summed)* | | | Storage Data (largest wins)** | | | |
|---|---|---|---|---|---|---|---|
| | Bytes in | Bytes out | Requests Count | Container Count | Container Count | Byte Count | NTI Type |
| 6 | 12 | 0 | 5 | | | | Transfer |
| 7 | | | | 2 | 4 | 16 | Storage |
| 8 | 3 | 2 | 3 | | | | Transfer |
| 9 | 7 | 1 | 1 | | | | Transfer |
| CAI #s | 36 | 3 | 9 | 2 | 5 | 16 | |

*Transfer Data CAI # for t1 is found by adding the total from t0 to the total from t1
**Storage Data CAI # is the largest number from both the t0 and t1 values

*FIG. 11*

USAGE AND BANDWIDTH UTILIZATION COLLECTION MECHANISM FOR A DISTRIBUTED STORAGE SYSTEM

FIELD OF THE INVENTION

At least one embodiment of the present disclosure pertains to data storage systems, and more particularly, to a technique for collecting usage and bandwidth utilization data in a distributed data storage system.

BACKGROUND

The pervasiveness of the Internet and the advancements in network speed have enabled a wide variety of different applications on storage devices. For example, cloud storage, or more specifically, network distributed data storage system, has become a popular approach for safekeeping data as well as making large amounts of data accessible to a variety of clients. As the use of cloud storage has grown, cloud service providers aim to address problems that are prominent in conventional file storage systems and methods, such as scalability, global accessibility, rapid deployment, user account management, and utilization data collection. In addition, the system's robustness must not be compromised while providing these functionalities.

Among different distributed data storage systems, an object storage system employs a storage architecture that manages data as objects, as opposed to other storage architectures like file systems which manage data as a file hierarchy, and block storage which manages data as blocks within sectors and tracks. Generally, object storage systems allow relatively inexpensive, scalable and self-healing retention of massive amounts of unstructured data. Object storage is used for diverse purposes such as storing photos and songs on the Internet, or files in online collaboration services.

There is a need for operators of storage systems to know how much data a user is storing in order to bill the user accordingly. Similarly, operators of network-based storage systems often need to know how much data was transferred in or out of the system. A multitude of factors must be accounted for when aggregating and reporting metrics used to cover these needs.

BRIEF DESCRIPTION OF THE DRAWINGS

One or more embodiments of the present disclosure are illustrated, by way of example, in the figures of the accompanying drawings, in which like references indicate similar elements.

FIG. 6 illustrates a table showing example node type interval (NTI) data collected from two clusters, each with two nodes, in accordance with the techniques introduced here.

FIG. 8 illustrates a table showing cluster account interval offset (CAIO) data derived based on the NTI data collected from two clusters of FIG. 6, in accordance with the techniques introduced here.

FIG. 9 illustrates a table showing that each NTI record contributes only once to one CAI datum and one CAIO datum, in accordance with the techniques introduced here.

FIG. 10 illustrates a table showing, for an example cluster, expected NTI count before and after an existing node changes which services (e.g. proxy, account, and/or container) that are running on it.

FIG. 11 illustrates how new NTI records are considered and aggregated when the records arrive, which may or may not be timely, in accordance with the techniques introduced here.

DETAILED DESCRIPTION

References in this description to "an embodiment," "one embodiment," or the like, mean that the particular feature, function, structure or characteristic being described is included in at least one embodiment of the present disclosure. Occurrences of such phrases in this specification do not necessarily all refer to the same embodiment. On the other hand, the embodiments referred to also are not necessarily mutually exclusive.

It is observed that operators of network-based storage systems often need to know how much data was transferred in or out of the system, but when it comes to an eventually consistent distributed object storage system, many issues arise such as ensuring both scalability and robustness when implementing mechanisms for aggregating and reporting metrics used to cover these needs. A few known projects for collecting measurements of the utilization of the physical and virtual resources having deployed clouds have suffered from several drawbacks. For instance, the transfer statistics (e.g., a device's transfer in data, transfer out data, and the number of client requests) are gathered from the nodes' attempts to emit packets for each request to a centralized collector entity without any particular receipt guarantee or retransmission mechanisms on failure. Not only does the packet emission introduce additional overhead on resource consumption, having a centralized collector may create a potential bottleneck when the system includes a high number of nodes. Conventional monitoring and metering mechanisms consequently have the drawback of inaccuracy, and lack of robustness and scalability issues.

Introduced here, therefore, is a technique that enables one or more mechanisms for collecting storage and transfer utilization metrics for an account in a distributed data storage system in ways that are more scalable and robust than the conventional ones. The system introduced herein provides a collection mechanism that is efficient for a data object storage system with scalable retrieval architecture that can be easily modified to meet the needs of different use cases. The system accomplishes this in part by having a portion of the processing take place on the storage nodes themselves, which scale horizontally. On each of the proxy nodes and storage nodes, utilization data for that node is first collected, essentially performing a first pass of aggregation. Only after the first pass is the post-aggregated data sent robustly to a central controller where the data is further aggregated and collated. In the case of some metrics, for example transfer utilization metrics, there can be an additional level of aggregation derived from the proxies access logs, for better accuracy. In addition, the technique disclosed here includes several aspects to ensure the robustness of the metrics collection mechanisms.

System Overview

Figure 1:
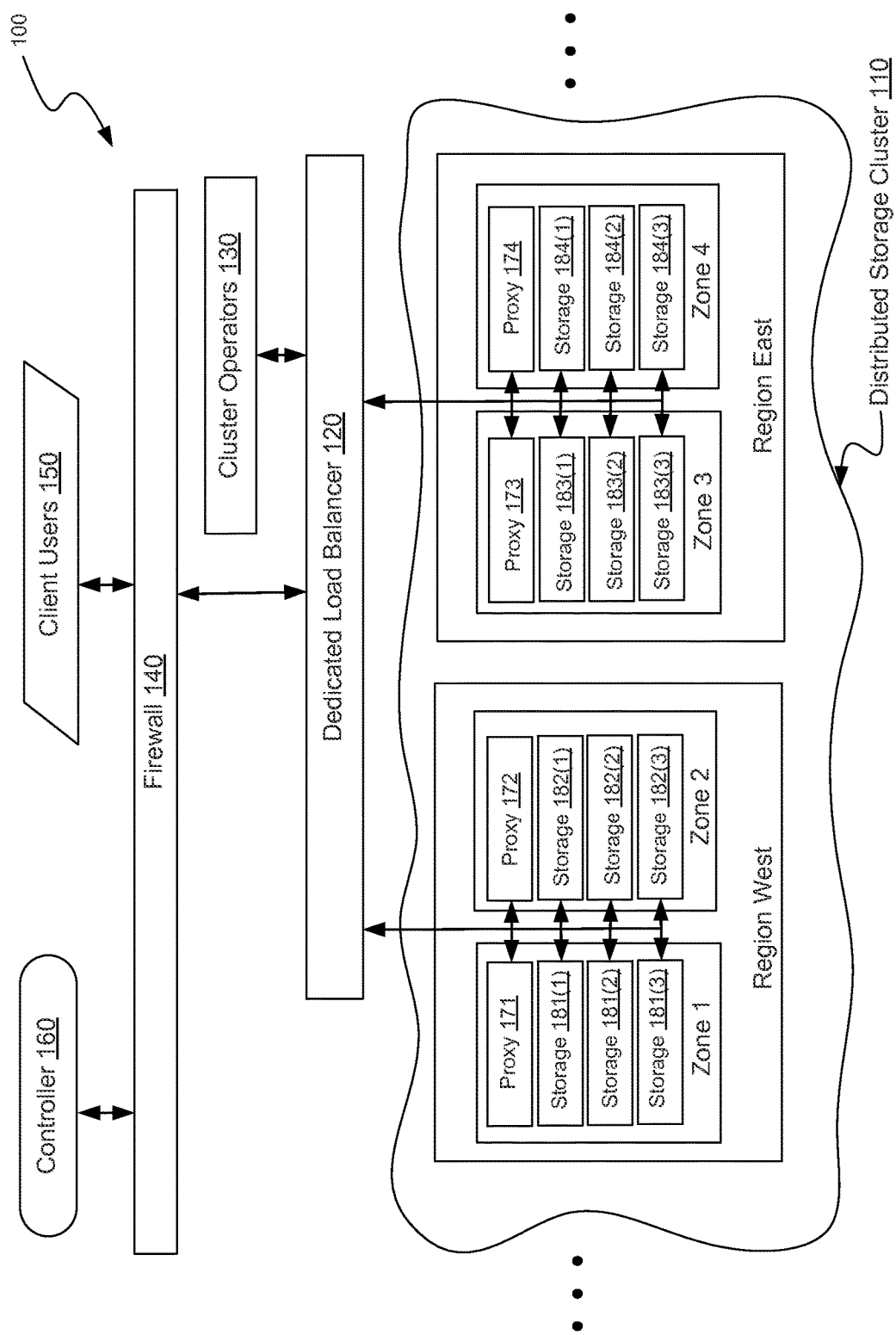
FIG. 1 illustrates a network storage system in which the present embodiments can be implemented.

FIG. 1 illustrates a network storage system 100 in which some embodiments of the techniques introduced here may be utilized. The network storage system 100 includes, for example, a distributed storage cluster 110, a dedicated load balancer 120, one or more cluster operators 130, a firewall 140, one or more client users 150, and a controller 160. One or more elements in the network storage environment 100 are communicatively coupled to each other through a computer communications network, which can be or include the Internet and one or more wired or wireless networks (e.g., an IP-based LAN, MAN or WAN, a Wireless LAN (WLAN) network, and/or a cellular telecommunications network).

The network storage system 100 can be an object storage system (e.g., OpenStack Object Storage system, also known as "Swift"), which is a multitenant, highly scalable, and durable object storage system designed to store large amounts of unstructured data at low cost. The system 100 is highly scalable because it can be deployed in configurations ranging from a few nodes and a handful of drives to thousands of machines with tens of petabytes of storage. The distributed object storage system 100 is designed to be horizontally scalable so there is no single point of failure. Storage clusters scale horizontally simply by adding new servers. If a server or hard drive fails, the system 100 automatically replicates its content from other active nodes to new locations in the cluster. Therefore, the system 100 can be used by businesses of variable sizes, service providers, and research organizations worldwide. It is typically used to store unstructured data such as documents, web and media content, backups, images, and virtual machine snapshots. Objects and files can be written to multiple disk drives spread throughout servers in the data center, with the system software responsible for ensuring data replication and integrity across the cluster.

Generally, a number of key characteristics of the storage system 100 differentiate it from other storage systems. For instance, the storage system 100 is not a traditional file system or a raw block device; instead, the storage system 100 enables users to store, retrieve, and delete objects (with their associated metadata) in logical containers (e.g., via a RESTful HTTP API). Developers can, for example, either write directly to an application programming interface (API) of the storage system 100 or use one of the many client libraries that exist for many popular programming languages, such as Java, Python, Ruby, and C#. Other significant features of the storage system 100 include being natively designed to store and serve content to many concurrent users, and being able to manage its storage servers with no additional vendor specific hardware needed. Also, because the storage system 100 uses software logic to ensure data replication and distribution across different devices, inexpensive commodity hard drives and servers can be used.

Referring back to FIG. 1, a distributed storage cluster 110 is the distributed storage system used for object storage. The cluster 110 is a collection of machines that are running server processes and consistency services (e.g., in the form of "daemons"). A "daemon" is a computer program that typically runs as a background process or service, as opposed to being under the direct control of an interactive user. Each machine running one or more processes and services is called a node. When there are multiple nodes running that provide all the processes needed to act as the distributed storage system 100 they are considered to be a cluster (e.g., cluster 110). There are four server processes: proxy, account, container and object. When a node has only the proxy server process running it is called a proxy node, such as proxy nodes 171-174. A node running one or more of the other server processes (account, container, or object) is called a storage node, such as storage nodes 181-184. Storage nodes contain the data that incoming requests wish to affect (e.g. a PUT request for an object would go to the appropriate nodes running the object server processes). Storage nodes can also have a number of other services running on them to maintain data consistency.

As illustrated in FIG. 1, within a cluster the nodes can also belong to two logical groups: regions (e.g., Region West and Region East, FIG. 1) and zones (e.g., Zone 1 with proxy server 171 and storage nodes 181(1)-181(3))-. Regions and zones are user-defined and identify unique characteristics about a collection of nodes—usually geographic location and points of failure, such as all the power running to one rack of nodes. These ensure the storage system 100 can place data across different parts of the cluster to reduce risk.

More specifically, the proxy servers 171-174 may function as an interface of the storage system 100 as they are the ones that communicate with external clients. As a result, they typically are the first and last to handle an API request. In some implementations, all requests to and responses from the proxy use standard HTTP verbs and response codes. The proxy servers 171-174 use a shared-nothing architecture and can be scaled as needed based on projected workloads. According to some embodiments, a minimum of two proxy servers should be deployed for redundancy—should one proxy server fail, the others will take over.

The storage nodes 181-184 are responsible for the actual storage of objects on the drives of its node. In some implementations, objects are stored as binary files on the drive using a path that is made up in part of its associated partition and the operation's timestamp. The timestamp may allow, for example, the object server to store multiple versions of an object but only providing the latest version for a typical download (GET) request. In other implementations, however, the timestamp may not be necessary to provide the latest copy of object during a GET. In these implementations, the system can return the first object returned regardless of timestamp. The object's metadata (standard and/or custom) can be stored in the file's extended attributes (xattrs), which means that the data and metadata are stored together and copied as a single unit.

Although not illustrated for simplicity, a node that runs an account server process can handle requests regarding metadata for individual accounts or the list of the containers within each account. This information can be stored by the account server process in SQLite databases on disk, for example. Also, a node that runs a container server process can handle requests regarding container metadata or the list of objects within each container. Note that, typically, the list of objects does not contain information about the location of the object, simply that it belongs to a specific container. Like accounts, the container information can be stored as SQLite databases. It is noted that, depending on the deployment, some nodes may run some or all services. That is to say, although illustrated as separated in FIG. 1, storage nodes and proxy server nodes may overlap in some implementations.

In some embodiments, the network storage system 100 optionally utilizes a load balancer 120. In general, the load balancer 120 is to distribute the workload evenly among the proxy servers. In some examples, the load balancer 120 is capable of effectively prioritizing TCP and UDP traffic. In addition, the load balancer 120 can distribute requests for HTTP sessions among a number of resources in the cluster 110. The load balancer 120 can be provided as one of the services run by a node, or can be provided from externally, such as round-robin DNS or a commercial load balancer.

Illustrated in FIG. 1 are two regions in the cluster 110. Regions are user-defined and usually indicate when parts of the cluster are physically separate—usually a geographical boundary. Accordingly, some embodiments, such as a cluster, should have a minimum of one region. The cluster 110 is using two or more regions and is a multi-region cluster. When a read request is made, a proxy server may favor nearby copies of the data as measured by latency. When a write request is made, the proxy layer can write to all the locations simultaneously. In variations, there can be an option called write affinity that, when enabled, allows the cluster to write all copies locally and then transfer them asynchronously to the other regions.

In accordance with some embodiments, within regions, the storage system 100 allows availability zones to be configured to, for example, isolate failure boundaries. An availability zone can be defined by a distinct set of physical hardware whose failure would be isolated from other zones. In a large deployment example, availability zones may be defined as unique facilities in a large data center campus. In a single datacenter deployment example, the availability zones may be different racks. It is common for a cluster to have many zones. A globally replicated cluster can be created by deploying storage nodes in geographically different regions (e.g., Asia, Europe, Latin America, America, Australia, or Africa). The proxy nodes can be configured to have an affinity to a region and can be able to optimistically write to storage nodes based on the storage nodes' region. Optionally, the client can have the option to perform a write or read that goes across regions (i.e., ignoring local affinity), if requested.

With the above elements of the storage system 100 in mind, an application example of the storage system 100 is introduced as follows. When a valid request is sent from a client user 150, through the firewall 140, to the storage cluster 110, the load balancer 120 first determines which proxy node in the storage cluster 110 is to be invoked. The proxy node (e.g. proxy 171-174) verifies the request and then determines, among the storage nodes 181-184, the correct storage nodes responsible for the data (based on a hash of the object name) and sends the request to those storage nodes concurrently. If one of the primary storage nodes is unavailable, the proxy will choose an appropriate hand-off node to send the request to. The nodes will return a response and the proxy will in turn return the first received response (and data if it was requested) to the requester. Generally speaking, the proxy server process looks up multiple locations because the storage cluster system 110 provides data durability by writing multiple—typically 3—complete copies of the data and storing them in the storage cluster system 110.

As mentioned before, proxy services handle the external communication with clients and the storage services handle the storage and maintenance of data stored in the storage system 100. Accounts are the root storage locations for data in a storage cluster (e.g., storage cluster 100). Containers are user-defined segments of the account that provide the storage location where objects are found. Accounts enable multiple users and applications to access the storage system at the same time. Accounts and containers store key information about themselves in separate databases (e.g., Account DBs, FIG. 2) that are distributed throughout the system. The accounts allow users who access them to create and store data in individual containers. Although containers cannot be nested, they are conceptually similar to directories or folders in a file system.

The controller 160 is the management system which provides operators 130 an interface (e.g., browser-based) to facilitate management of the nodes, configuration of networking, and management of user accounts for their organization's cluster. Operators 130 can also use the controller 160 for monitoring, authentication integrations, alerts, system statistics and reports. These statistics and reports are based on accurately aggregated data and allow operators 130 to determine storage utilization for chargeback, billing, and other purposes. This can be useful for entities who would like to leverage the multi-tenancy of the controller 160 to allow their own customers to manage their storage clusters through the controller 160.

In some embodiments, the controller 160 may be accessed online. According to some embodiments, the controller 160 may be installed and run within the network as its nodes, regardless of that implementation detail of some embodiments its management function of the cluster is independent of the proxy and data storage functions that the nodes are performing.

A multi-tenant central management system (e.g., the controller 160) that manages and monitors an eventually consistent distributed storage system (e.g., system 100) faces unique challenges when collecting and aggregating data metrics. Operators of any storage system need to know how much data a user is storing in order to charge the user accordingly. Similarly, operators of network-based storage systems often need to know how much data was transferred in or out of the system. Metrics that can satisfy these needs may be based on data which could include, for example, an account identification (ID), along with the following data per account: the number of bytes used per storage category, the number of bytes transferred into the cluster, and the number of bytes transferred out of the cluster. An eventually consistent distributed storage system that uses replicas for durability has several factors (e.g., robustness, scalability, and accuracy) that must be accounted for when aggregating and reporting these metrics.

Accordingly, the controller 160 employs one or more mechanisms for collecting storage and transfer utilization metrics for an account in the storage system 100 that are more scalable and robust than conventional ways. As previously introduced, the controller 160, along with other elements in the system 100, accomplishes this, in part, by having a portion of the processing take place on the storage nodes themselves, which scale horizontally. On each of the proxy servers and storage nodes, utilization data for that node is first collected, essentially performing a first pass of aggregation. Only after the first pass then is the post-aggregated data sent robustly to a central controller where the data is further aggregated and collated. Also, in the case of some metrics, for example transfer utilization metrics, there can be an additional level of aggregation derived from the proxies access logs for better accuracy. In addition, the techniques include several mechanisms to ensure the robustness of the metrics collection mechanisms.

More specifically, in the storage cluster 110, storage metrics (e.g., container count, object count, and total bytes used) are stored in account databases (e.g., Swift Account DBs) that are distributed throughout the system 100. Raw transfer data are stored in log files on the proxy nodes. Overall, the collection mechanism collects, aggregates and stores (1) utilization data (container count, object count, and total bytes stored) from account databases and (2) transfer metrics (bytes in, bytes out, and request count) from all nodes across a distributed storage system. Based on methods of data collection, aggregation and correction, this collection mechanism produces metrics for storage utilization and transfer activity, which can be used for reporting, billing and/or chargeback purposes. Both storage utilization and transfer metrics are collected, and in some cases, for example with transfer metrics there may also be some amount of preliminary computation, at their respective nodes before they are sent to the controller 160 for aggregation, storage, and presentation. The metrics can be sent via, for example, a RESTful API. The raw proxy logs and the collected storage data can also be stored in the storage cluster 110 itself to support resolution of any billing disputes.

Storage Metrics Collection

Figure 2:
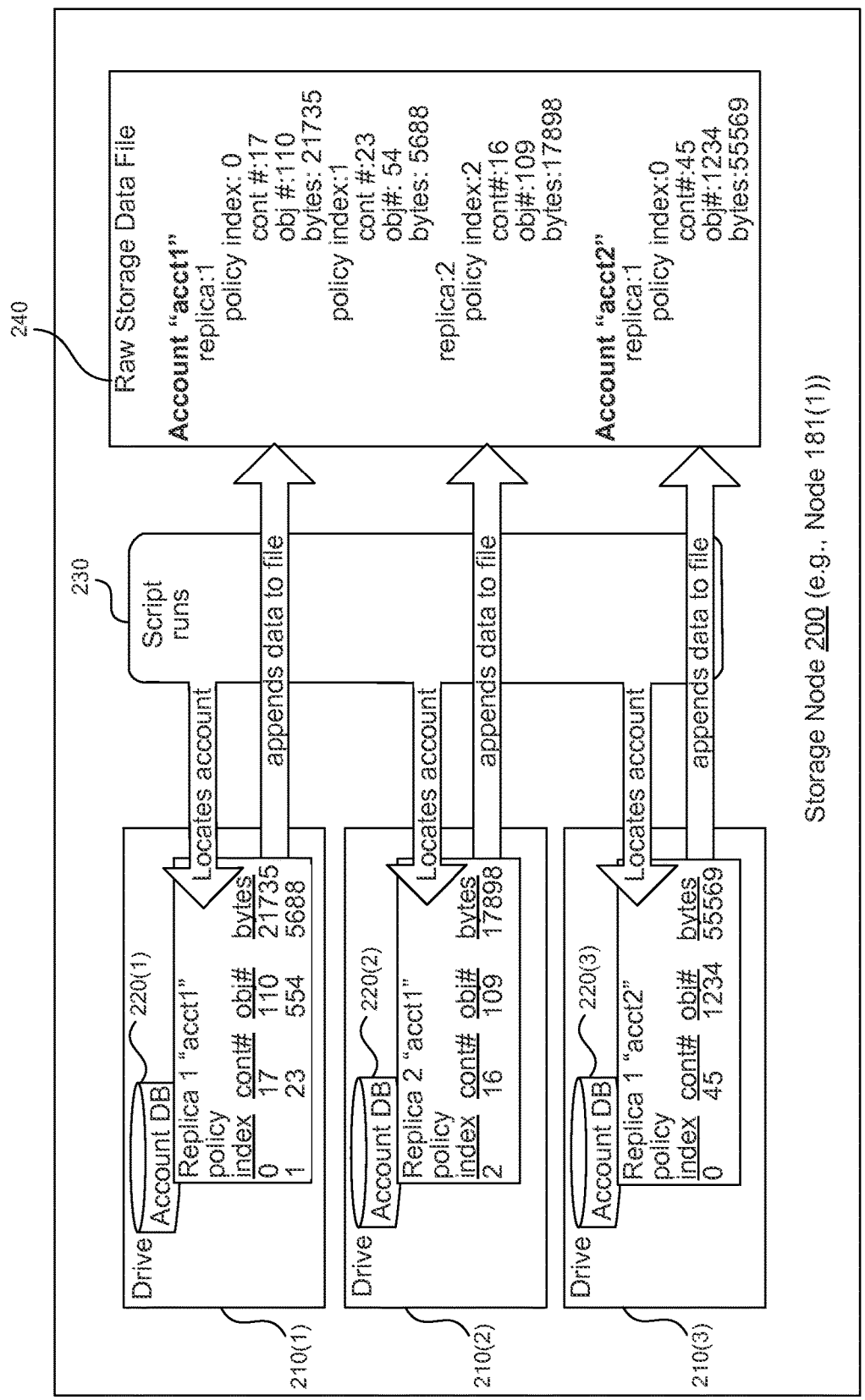
FIG. 2 illustrates an example storage node in a data storage system implementing storage metrics collection techniques introduced here.

FIG. 2 illustrates an example storage node 200 in a data storage system implementing storage metrics collection techniques introduced here. The storage node 200 is an example implementation of the storage nodes 181-184 in the distributed storage system 100. Data and figures illustrated in FIG. 2 are an example representation of what a specific raw storage data file may contain. FIG. 2 is explained further below with reference to FIG. 1.

According to some aspects of the collection technique disclosed here, storage utilization metrics are collected on each storage node, which could run services including those, for example, for accounts and containers (nodes 181-184) in the cluster 110. For example, the script 230 can be run by the node 200 every 30 minutes. In some examples, the script is run by a software utility that is a time-based job scheduler in the computer operating systems such as "Cron." When performed, the script 230 accesses the local disks 210(1)-210(3) containing account databases (DBs) 220(1)-220(3), opens each database, and extracts (i) the container count, (ii) object count, and (iii) bytes used values for each storage policy for that replica of that account. An in-memory data structure, for example, can be maintained on the node 200 during this process, and data for all account databases 220 on the node 200 can be stored to disk (e.g., in a single file, such as a raw storage data file 240). It is observed that, typically, only very small clusters would have more than one replica of a particular account database on different disks in the same server, but if this is the case, preferably each replica's unique values are stored. Note that, in one or more embodiments, there is no aggregation performed on the data at this point. Assuming there are no failures in data collection or transmission to the controller 160, the controller 160 will receive one unique set of container count, object count, and bytes used values per storage policy per replica for each account.

Figure 3:
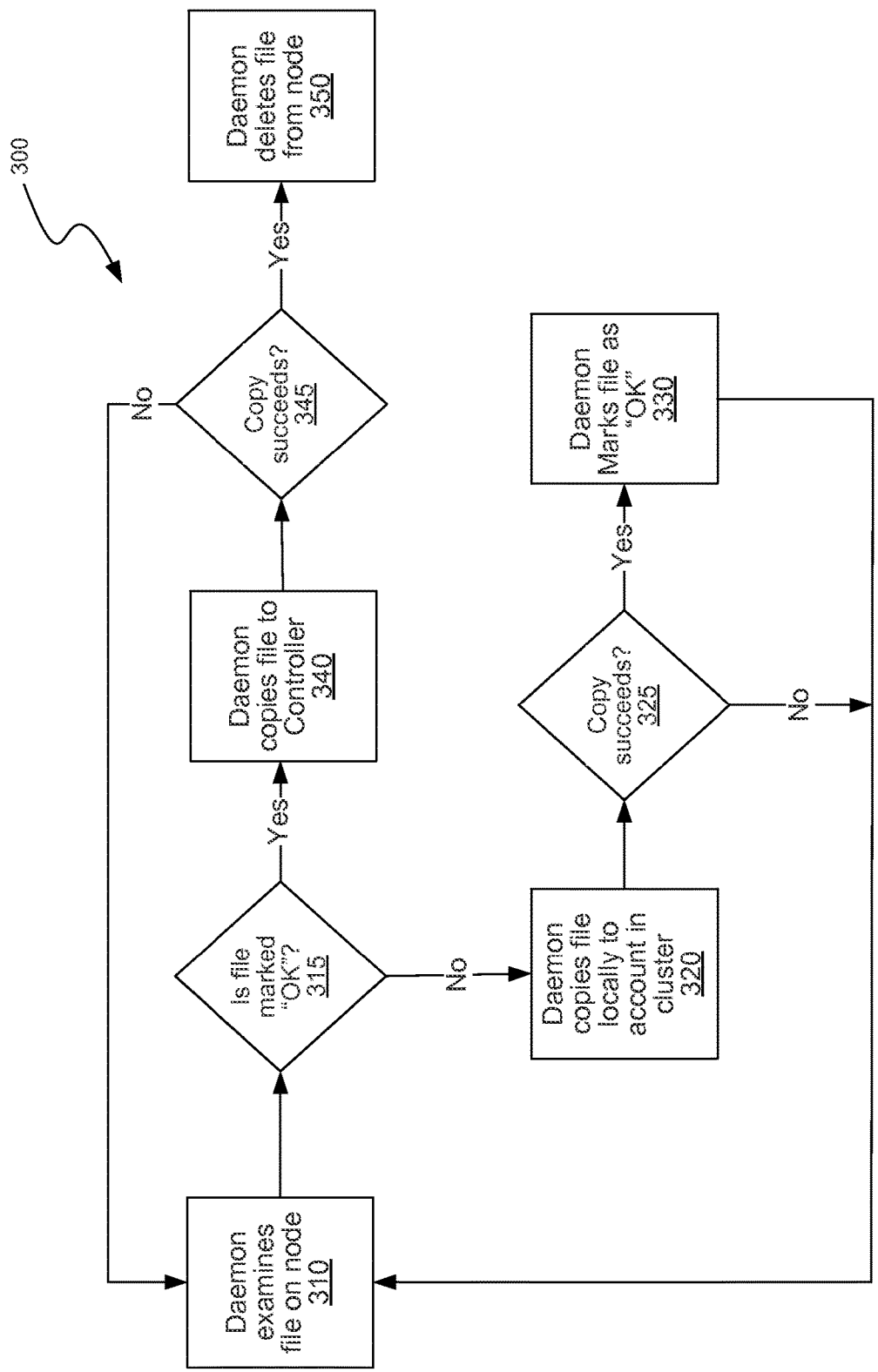
FIG. 3 illustrates a method of collecting storage metrics in a data storage system in accordance with the techniques introduced here.

In some embodiments, a long-running daemon process (e.g., running on the node 200) can periodically look for the single file 240 containing container count, object count, and bytes used for all account DBs 220(1)-220(3) on the node 200. FIG. 3 illustrates a method 300 of collecting storage metrics in a data storage system in accordance with the techniques introduced here. The method 300 can be performed by, for example, the long-running daemon process running on the node 200.

First, the daemon process running on the node 200 can locate, by periodically searching for, the raw storage data file 240 on the node 200. When such a file 240 is found on the node 200, the daemon process examines (310) the file 240 (and the file 240's associated metadata, for example). If the file 240 is not marked as "OK" (indicating that it has yet to be backed up to the cluster) (315), then the daemon uploads or copies (320) the file 240 to an administrative account in the cluster 110. If this upload or copy succeeds (325), then the data file 240 is marked (330) by the daemon as "OK," indicating that it has been successfully backed up to the cluster 110.

Specifically, in one or more implementations, when the long-running daemon intends to upload into the cluster, the daemon can execute codes that are similar to what a proxy server would run. For example, it may be the same computer codes with a slightly different configuration that has no authentication. Because the codes are similar to proxy server codes, the codes can determine where data is stored and how to access those locations. Therefore, in these implementations, the storage node 200, for a brief period of time, can function similarly as a proxy node and store data as if the data came from the cluster users 150 (or the cluster operators 130). That is to say, in these embodiments, data from within the cluster are stored inside the cluster 110 by the storage node 200 as if that data came from outside the cluster 110.

Continuing with the above example, if the file 240 is marked as "OK" (315), then the daemon attempts to send (340) the file 240 to the controller 160. If the data transmission is acknowledged by the controller 160 as having been received (345), the long-running daemon process deletes (350) the data file 240. In the manner described in the method 300, the copying into the cluster 110 and the transmission of the data to the controller 160 are retried until they succeed. This mechanism provides robustness to the data utilization collection system.

Note that, by uploading or backing up to the cluster 110, the daemon running on node 200 utilizes the storage system 100 itself to benefit from the system 100's durability and high availability for storing the raw data safely.

Also, note that it is recognized that, in real practice, there are a number of (e.g., three) replicas of an account database for every account, and although theoretically they will eventually converge to one number, they may not be the same at a given instance of time. In one embodiment, when the controller 160 faces a number of choices, the controller 160 may pick the maximum. For example, if one replica account database reports that there are ten containers under an account, another one reports that there are nine containers, and yet another one reports that there are eleven containers, the controller 160 may choose to accept, at least temporarily, that there are eleven containers. The system 100 will gradually and eventually reach the correct number.

Transfer Metrics Collection

Figure 4:
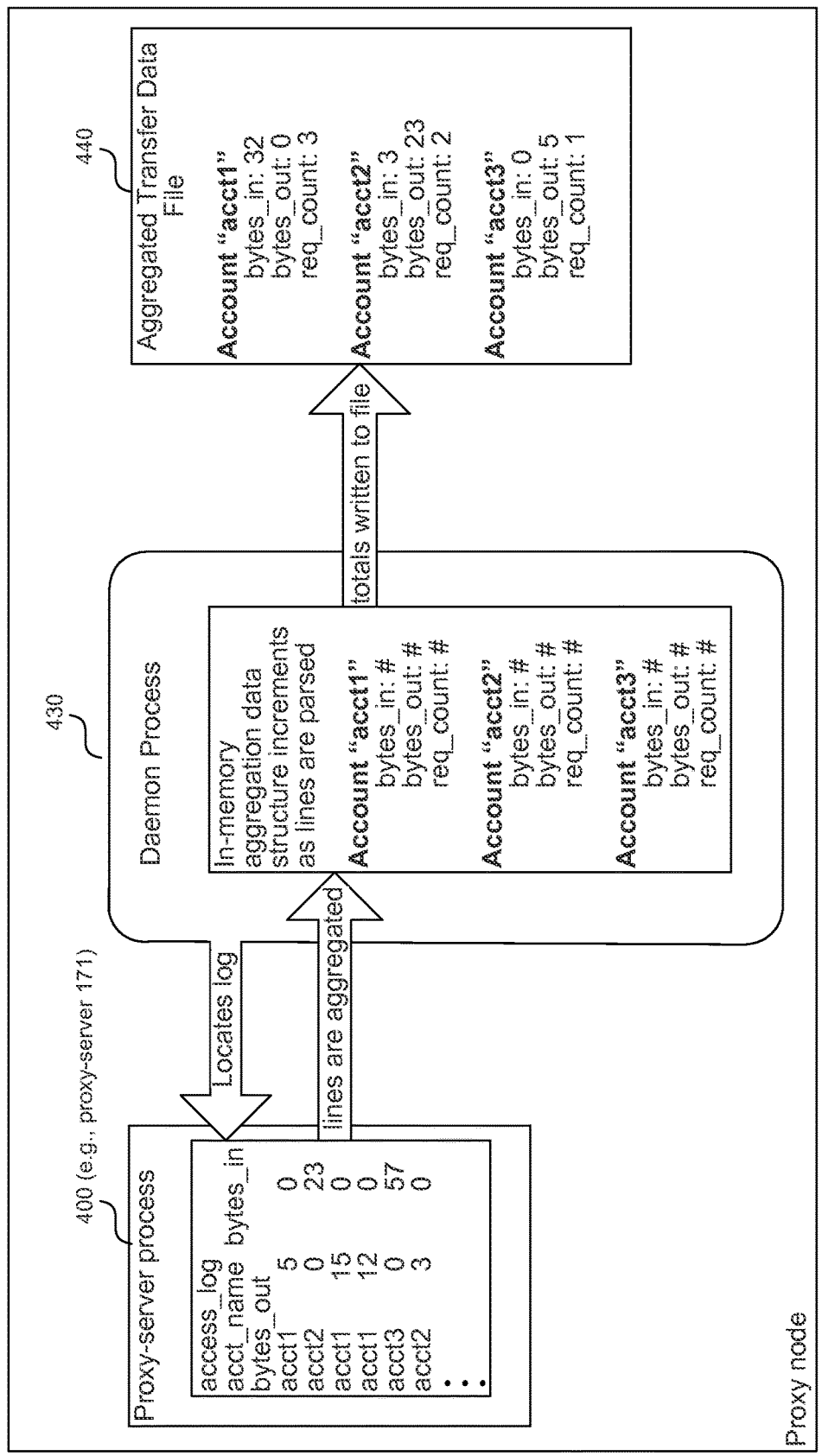
FIG. 4 illustrates an example proxy server in a data storage system implementing transfer metrics collection techniques introduced here.

FIG. 4 illustrates an example proxy server 400 implementing transfer metrics collection techniques introduced here. The proxy server 400 is an example implementation of the proxy servers 171-174 in the distributed storage system 100. Data and figures illustrated in FIG. 4 are an exemplary representation of what a specific aggregated transfer data file may contain. FIG. 4 is explained further below with reference to FIG. 1.

According to some aspects of the collection technique disclosed here, transfer metrics (e.g., bytes in, bytes out, and request count) are collected from the proxy-server log files on each of the proxy nodes in the system 100. The proxy-server process on each node can generate the access log file by writing one log line to the file for each access request. In some embodiments, to prevent data corruption, the proxy server 400 could, for example, every 30 minutes (e.g., through a Cron job), rotate the access log file from "proxy_access.log" to "proxy_access.##," where ## can be 01, 02, and so forth.

Figure 5:
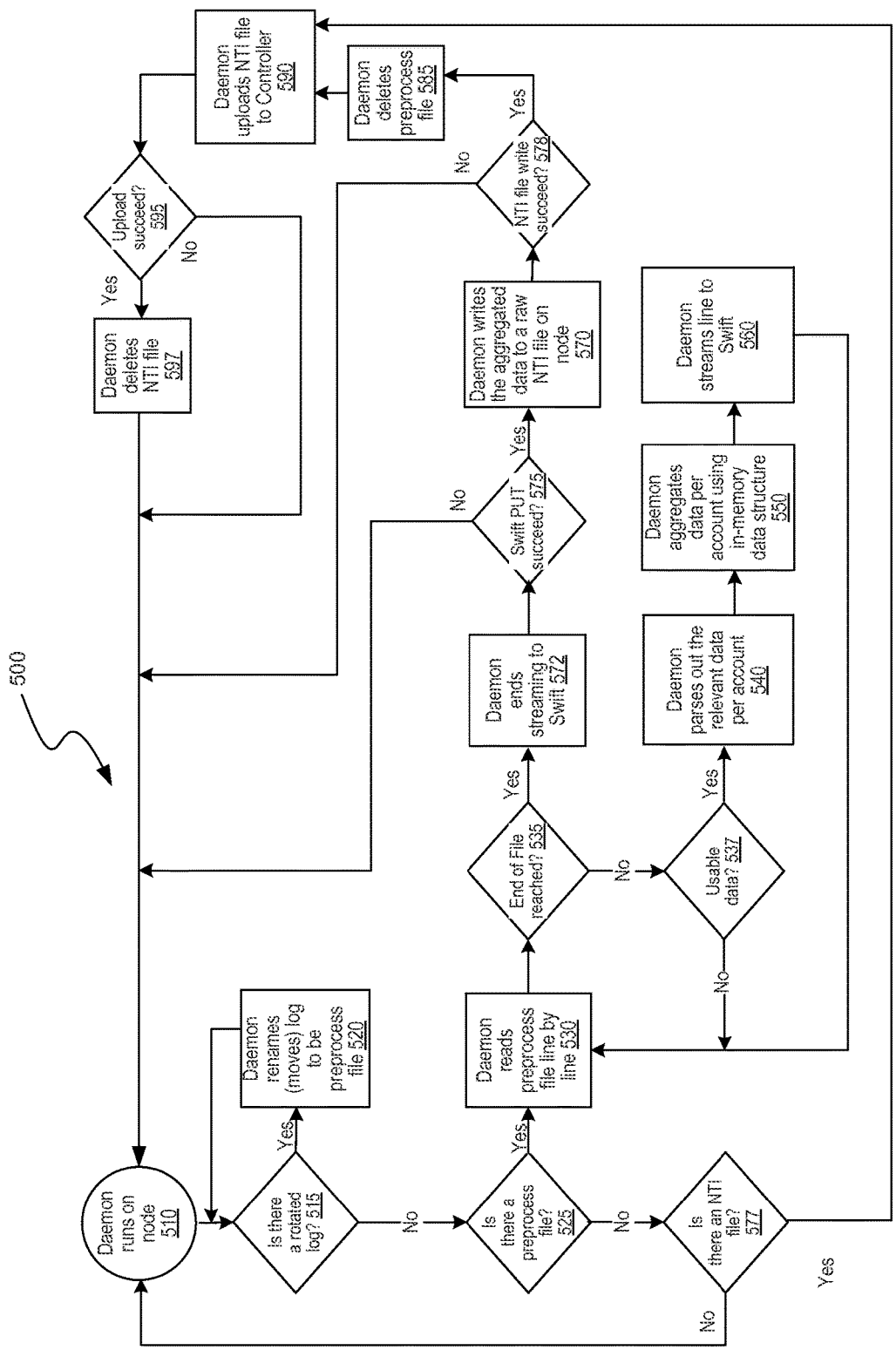
FIG. 5 illustrates a method of collecting transfer metrics in a data storage system in accordance with the techniques introduced here.

In some embodiments, a long-running daemon process 430 (e.g., running on the proxy server 400) (510) can periodically look (515) for the rotated log files on the proxy server 400. FIG. 5 illustrates a method 500 of collecting transfer metrics in a data storage system in accordance with the techniques introduced here. The method 500 can be performed by, for example, the long-running daemon process 430 running on the proxy server 400. When a rotated log file is found, the daemon process 430 renames (520) it to have unique names (such as "proxy_access_preprocess.##," where ## is 01, 02, etc.). Once the rotated log files have been renamed, all "proxy_access_preprocess.*" files (including any present from previous runs) are processed (525) by the long-running daemon on the proxy server 400.

The processing of a "proxy_access_preprocess" file involves the daemon 430 parsing out (530) three values from each log line: account name, bytes in (to the cluster), and bytes out (of the cluster) until the file ends (535). According to some implementations, internal proxy sub-requests and unparsable garbage lines are ignored (537). As the daemon 430 parses out (540) relevant data per account, an in-memory aggregation data structure, for example, can be maintained (550) by the daemon 430 on a per-account basis. The aggregation data structure can be designed so that, for each log line, the bytes in and bytes out values are incremented by the parsed-out values, and the request count value is incremented by one.

During the parsing/aggregation stage, the raw contents of the log file may be optionally compressed, and then streamed or uploaded (560) into the cluster 110. This allows for auditing the aggregated data at any time in the future. After the parsing reaches the end of the file (535), the daemon 430 ends (572) the streaming of raw contents of the log file to the cluster 110. If the storage of the raw transfer data to cluster 110 fails (575), then the "proxy_access_preprocess" file remains for a later process (e.g., via decision box 525), allowing the system to recover from transient failures. If the storage of the raw transfer data to cluster 110 succeeds (575), meaning that the raw transfer data is backed up to the cluster 110, then the daemon 430 writes (570) the aggregated data into an aggregated transfer data file 440 (e.g., on a proxy node). If the generation of the aggregated data file 440 is not successful (578), then again the "proxy_access_preprocess" file is left alone. If the generation of the aggregated transfer data file 440 is successful (578), then the "proxy_access_preprocess" file is removed (585).

After processing a "proxy_access_preprocess" file, the aggregated transfer data files 440 is sent (590) by the daemon 430 to (e.g., a process on) the controller 160. If the data is not acknowledged by the controller 160 as having been received (595), then the aggregated transfer data file 440 is left alone for a later process (e.g., via decision box 577). If the data is acknowledged by the controller 160 as having been received (595), then the long-running daemon process 430 deletes (597) the aggregated transfer data file 440. In the manner as described in the method 500, the upload into the cluster 110 and the transmission of the data to the controller 160 are retried until they succeed.

Note that, in the case of distributed storage, there might also be instances where network connectivity between a node and its cluster is down for a period of time. For this reason, at least one embodiment is designed so that when the connection is reestablished, all unsent metric packages are transmitted to the controller 160. Also, at least one reason the utilization collection mechanism stores the raw proxy server lines, and not the aggregated file 440, in the cluster 110, is that it may be easier to resolve any dispute (e.g., on the number of access requests made) by starting from the raw transfer lines as compared to the output of some system that an end-user may not necessarily understand or trust.

In addition, note that a reason that data aggregation is performed on the transfer metrics but not storage metrics is that, for transfer statistics, relevant access log lines may be present on any location in the cluster 110, for example, perhaps because the load balancer 120 may be distributing the account's requests across various proxy servers). This is in contrast with the account data, which is sourced from a limited number of places (e.g., three places, if assuming the system 100's using standard configuration of having three replicas).

Data Aggregation at the Controller

FIG. 6 illustrates a table 600 showing example node type interval (NTI) data collected from two clusters, each with two nodes, in accordance with the techniques introduced here.

Continuing with the above example illustrated in FIGS. 2 and 4, the raw storage and transfer data sent from nodes are called "NodeTypeInterval" (NTI) data. These data are stored on the controller 160 for further processing. More specifically, in some embodiments, each NTI record can cover a 30-minute window, called the "NTI interval." An NTI record is a "storage" type if it contains account DB information, or a "transfer" type if it contains proxy transfer information. According to some embodiments, NTI intervals are defined to start on the 0th and 30th minute of each hour in Coordinated Universal Time (UTC). For example, there is one NTI interval from 2014-20-12 13:00:00 UTC to 2014-20-12 13:30:00 UTC, and the subsequent NTI interval is from 2014-20-12 13:30:00 UTC to 2014-20-12 14:00:00 UTC.

Figure 7:
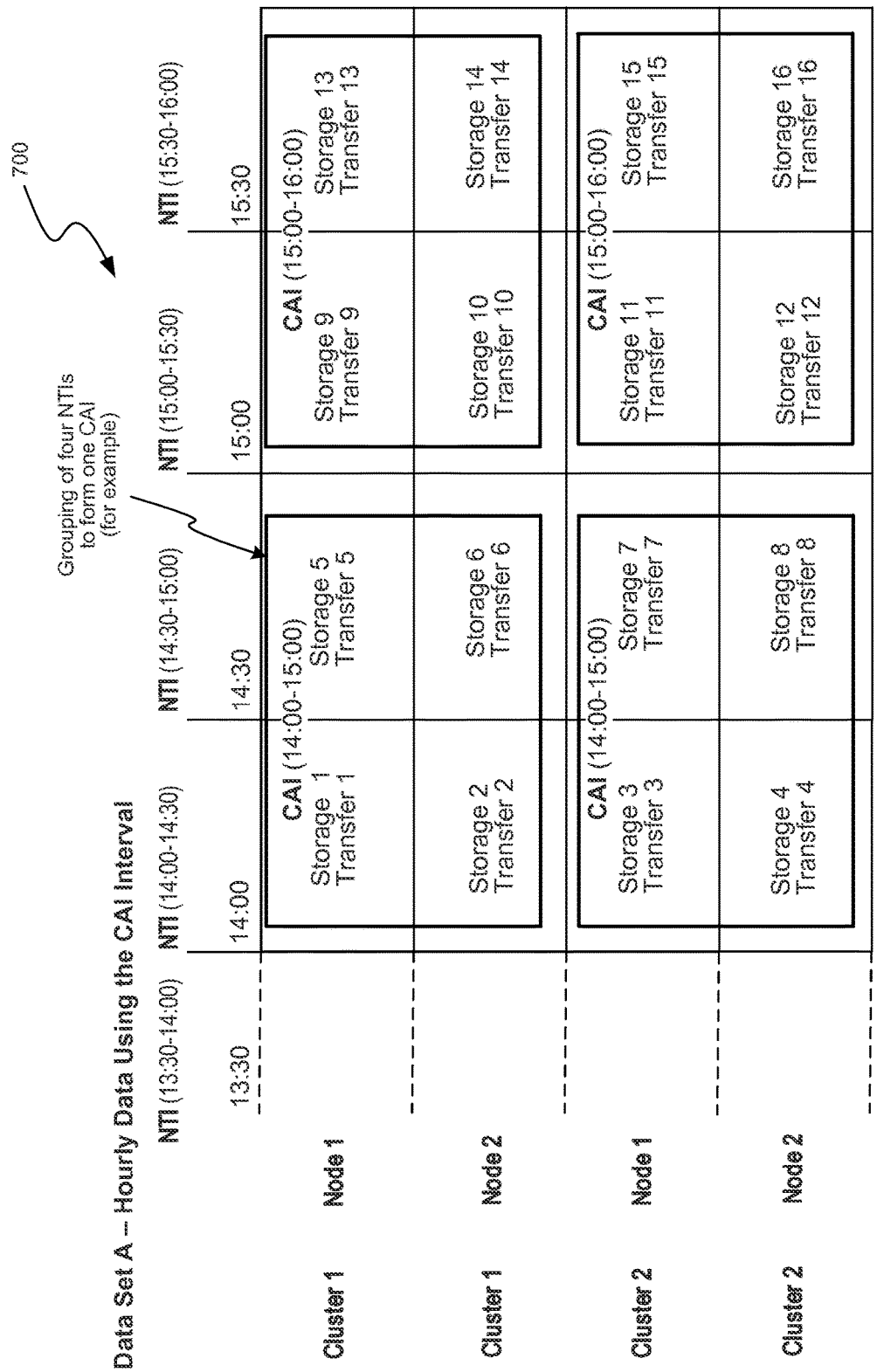
FIG. 7 illustrates a table showing cluster account interval (CAI) data derived based on the NTI data collected from two clusters of FIG. 6, in accordance with the techniques introduced here.

FIG. 7 illustrates a table 700 showing cluster account interval (CAI) data derived based on the NTI data collected from two clusters of FIG. 6, in accordance with the techniques introduced here.

According to some embodiments, one of the products generated by the controller 160 based on the NTI data is "ClusterAccountInterval" (CAI) data, which includes the cluster ID, the account name, and a value for each of the following metrics: container count per storage policy, object count per storage policy, total bytes stored per storage policy, bytes in, bytes out, and request count. In one or more embodiments, each CAI record can cover a 1-hour window, called the "CAI interval." CAI intervals are defined to start on the 0th minute of each hour in UTC. As such, the one CAI interval from 2014-20-12 13:00:00 UTC to 2014-20-12 14:00:00 UTC spans two NTI intervals (the same two given as examples above in FIG. 6). Note that, in the provided example, each CAI datum is derived from one NTI record of each of the two types for two NTI intervals, or 4 NTI records per node. By the same token, a 3-node cluster may have 12 NTI records as input for each CAI record.

FIG. 8 illustrates a table 800 showing cluster account interval offset (CAIO) data derived based on the NTI data collected from two clusters of FIG. 6, in accordance with the techniques introduced here.

According to some embodiments, another one of the products generated by the controller 160 based on the NTI data is "ClusterAccountIntervalOffset" (CAIO) data, which is similar to the aforementioned CAI data except that the "CAIO Interval" is defined as a 1-hour window starting on the 30th minute of each hour in UTC. Together, CAI and CAIO data may provide hour-granular usage data for any timezone in the world which is at least half-hour aligned with UTC as well as a natural 50/50 data sharding. Not only does this mechanism enable the capability to deliver periods of billing data that line up with different intervals within a particular time zone, but this also further enhances the overall robustness of the utilization data collection mechanism.

FIG. 9 illustrates a table 900 showing how each NTI record contributes only once to one CAI datum and one CAIO datum, in accordance with the techniques introduced here. In one or more embodiments, each NTI record is tracked by the controller 160 as having contributed to none, the CAI record, the CAIO record, or both records. In this manner, each NTI record contributes to its two CAI records only once each.

FIG. 10 illustrates a table 1000 showing, for an example cluster, expected NTI count before and after an existing node changes which services (e.g. proxy, account, and/or container) that are running on it. More specifically, the table 1000 tracks the expected count of NTI records per CAI/CAIO interval and as well as the count of actually processed NTI records. This allows a "percent complete" value, between 0% and 100%, to be computed and included along with the usage data.

More specifically, the disclosed utilization collection mechanism can compute how many NTI reports that the controller 160 is supposed to receive by counting the number of nodes that should have account and container data, and the number of nodes that should have proxy data. It is noted that, depending on the deployment, storage nodes and proxy server nodes may overlap. For example, in some deployments, a node may run some or all the services (e.g., proxy server, storage, account, etc.). By being able to deliver a percentage of the nodes actually reporting out of the nodes that should be reporting, the utilization collection mechanism enables the customers understand the quality of the utilization report.

FIG. 11 illustrates a table 1100 showing how new NTI records are considered and aggregated when the records arrive, which may or may not be timely, in accordance with the techniques introduced here.

A finalization window is provided to determine a point in the past after which new NTI data will not be processed (meaning the CAI and CAIO data becomes immutable). For example, if the finalization window is 4 days, and a NTI record arrives 4 days and 1 hour late, the NTI record will be thrown away and not processed. This allows for stable bills to be generated while still tolerating some transmission failures for NTI data.

More specifically, because NTI data on the controller 160 is periodically aggregated, one or more NTI data may be aggregated into existing aggregated values. For example, if 5 NTI data have been processed, and then an additional 5 NTI data need to be processed, only the aggregated result of the first processing and the additional 5 NTI records need to be considered. In the implementation illustrated in table 1100, the storage data is aggregated using a MAX function and the transfer data is aggregated with a SUM function. When one or more NTI data for a particular CAI/CAIO interval are aggregated, an in-memory data structure, for example, can be used to record the maximum value for storage data and sum of values for transfer data per account. Then, the CAI or CAIO database table can be either inserted into with the aggregated result or updated to include the new aggregated result. In other words, each storage value will be the MAX of the previous value and the new one, and each transfer value will be the sum of the previous value and the new one.

In some embodiments, when an NTI record is older than the finalization period, it is deleted. One or more embodiments provide that the raw data for every NTI record can remain stored in the source cluster 110 indefinitely, for example, providing auditability. In this way, any CAI/CAIO record can be regenerated from the raw data.

Extra Notes on Efficient Rules Execution and Metrics Handling

It is observed that, in a network distributed storage system such as system 100, some types of rules files may generate a large work load. More specifically, when rules files involve pattern matching and aggregation of time-series data points, among other examples, then the efficiency of the execution of these rules files may have a large impact on the system's performance.

Take a specific rules file as an example. A rules file may describe that (1) a source metric (e.g., "a.b.c") should be aggregated into an "aggregate metric" (e.g., X.b.c), (2) then take an input metric name and a data point (<time>, <value>), and (3) (a) decide if the metric "a.b.c" is one of potentially many "source metrics" for a derivative metric name "aggregate metric," and if so, find the buffer instance for that "aggregate metric" and feed it the data point. Successful execution of this particular rules file may require the system to process the involved decision and handle multiple thousands of times per second (e.g., 2,000 metrics/s).

Accordingly, a method is introduced here that can increase the efficiency on pattern matching and aggregation of time-series data points for a distributed system. More specifically, the method can maintain an in-memory cache, for example, and the in-memory cache can include:

(1) A list mapping numeric index ("rule_idx") to a unique identifier for an aggregation rule object;

(2) A hash mapping full source metric name to one or more tuples of (<rule_idx>, <aggregate-metric-name>); and (3) A set of all source metrics for which the hash is authoritative; a source metric not in this set triggers an "on demand" population of this source metric's entry in the hash.

In some embodiments, this cache is written to disk when changed, and is loaded into memory on process start. Most metrics are processed with a single hash look-up, with an infrequent, light cost for reloading rules when the rules file changes and when new source metrics are seen for the first time.

Figure 12:
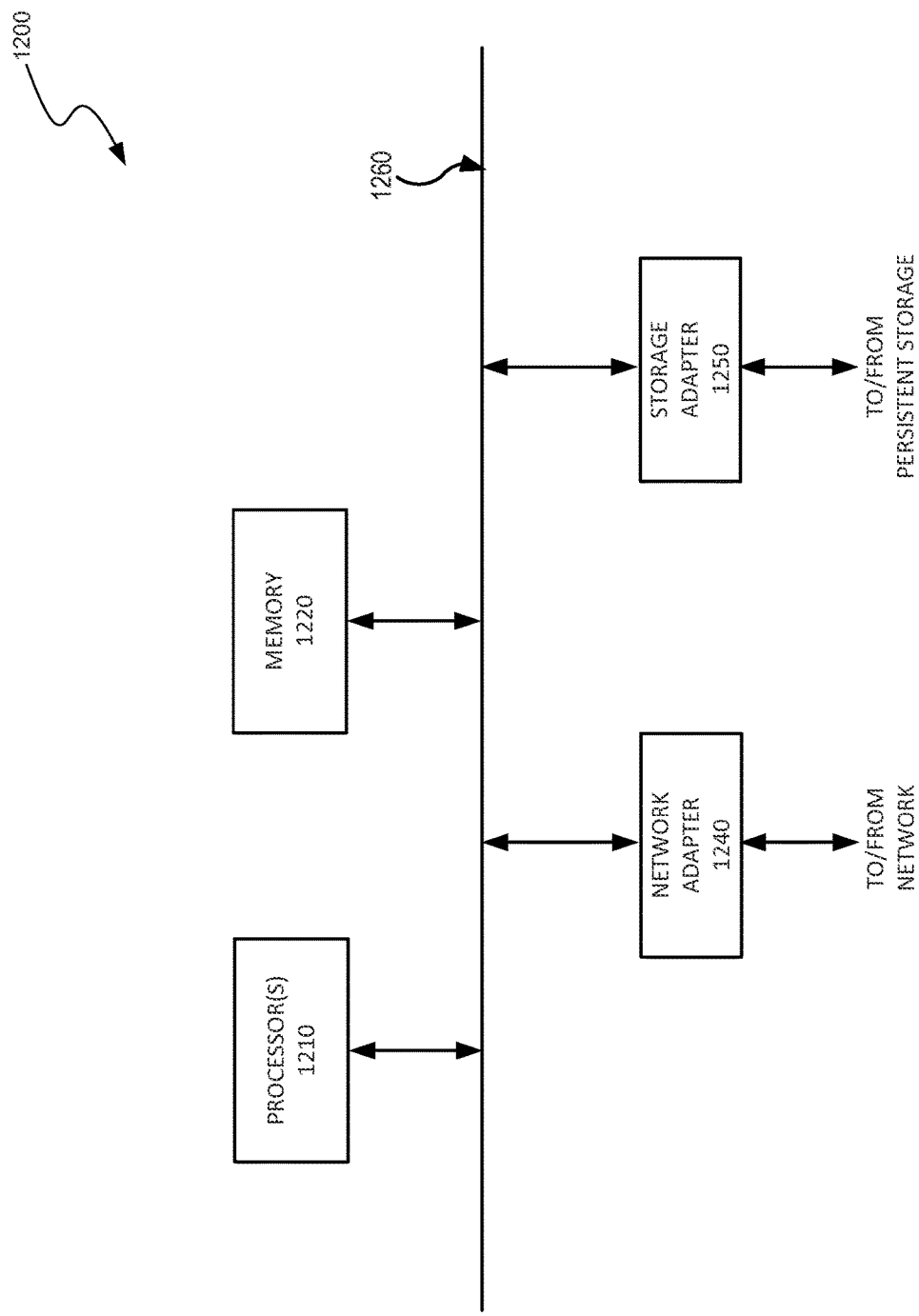
FIG. 12 is a block diagram of a computing device that may be used to implement the techniques introduced here.

FIG. 12 is a block diagram of a computer system 1200 that can be used to implement components of the storage system 100. For example, the system 1200 can be used to implement a client system, a computer, a network device, a proxy server or a storage node. Storage node 200 of FIG. 2 and proxy server 400 of FIG. 4 are two examples of components that may be implemented through the computer system 1200 although other configurations and operations are possible. In an illustrative embodiment, computer system 1200 includes one or more processor(s) 1210, memory 1220, a network adapter 1240, and a storage adapter 1250, all interconnected by an interconnect 1260.

Memory 1220 includes storage locations that are addressable by processor(s) 1210 and adapters 1240 and 1250 for storing software program code and data structures associated with the techniques introduced here. Processor(s) 1210 and adapters 1240 and 1250 may, in turn, include processing elements and/or logic circuitry configured to execute the software code and manipulate the data structures. It will be apparent to those skilled in the art that other processing and memory implementations, including various machine-readable storage media, may be used for storing and executing program instructions pertaining to the techniques introduced here.

Network adapter 1240 includes a plurality of ports to couple storage server 1200 with one or more other systems over point-to-point links, wide area networks, virtual private networks implemented over a public network, or a shared local area network. Network adapter 1240 can include the mechanical components and electrical circuitry needed to connect storage server 1200 to a network. One or more systems can communicate with other systems over the network by exchanging packets or frames of data according to pre-defined protocols, such as TCP/IP.

Storage adapter 1250 interfaces with an operating system running on processor(s) 1210 to access information on attached storage devices. The information may be stored on any type of attached array of writable storage media, such as HDDs, magnetic tape, optical disk, flash memory, SSDs, RAM, MEMs and/or any other similar media adapted to store information. Storage adapter 1250 includes a plurality of ports having I/O interface circuitry that couples with disks or other storage related devices over an I/O interconnect arrangement.

CONCLUSION

Embodiments of the present invention include various steps and operations, which have been described above. A variety of these steps and operations may be performed by hardware components or may be embodied in machine-executable instructions, which may be used to cause one or more general-purpose or special-purpose processors programmed with the instructions to perform the steps. Alternatively, the steps may be performed by a combination of hardware, software, and/or firmware.

Embodiments of the present invention may be provided as a computer program product which may include a machine-readable medium having stored thereon non-transitory instructions which may be used to program a computer or other electronic device to perform some or all of the operations described herein. The machine-readable medium may include, but is not limited to optical disks, compact disc read-only memories (CD-ROMs), magneto-optical disks, floppy disks, ROMs, RAMs, erasable programmable read-only memories (EPROMs), electrically erasable programmable read-only memories (EEPROMs), magnetic or optical cards, flash memory, or other type of machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link.

The phrases "in some embodiments," "according to some embodiments," "in the embodiments shown," "in other embodiments," "in some examples," and the like generally mean the particular feature, structure, or characteristic following the phrase is included in at least one embodiment of the present invention, and may be included in more than one embodiment of the present invention. In addition, such phrases do not necessarily refer to the same embodiments or different embodiments.

While detailed descriptions of one or more embodiments of the invention have been given above, various alternatives, modifications, and equivalents will be apparent to those skilled in the art without varying from the spirit of the invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof. Therefore, the above description should not be taken as limiting the scope of the invention, which is defined by the claims.

What is claimed is:

1. A method for collecting utilization data for a plurality of accounts in a distributed storage cluster including a controller and a plurality of nodes, each node coupled to a plurality of drives, the method comprising:
for each of the nodes, collecting storage utilization data for a one account by:
extracting, at a given node, a plurality of storage utilization parameters recorded under the one account from each of a plurality of account databases that are maintained by a plurality of drives coupled to the given node until all drives coupled to the given node are processed;
generating a raw storage data file based on the plurality of storage utilization parameters extracted at the given node to the raw storage data file;
storing the raw storage data file on the given node;
locating, by the given node periodically searching for, the raw storage data file on the given node;
upon the raw storage data file being located:
copying the raw storage data file to the cluster until the raw storage data file is successfully copied to the cluster;
upon successfully copying the raw storage data file to the cluster, marking the raw storage data file as copied;
uploading the raw storage data file to the controller until the raw storage data file is successfully uploaded to the controller; and
upon successfully uploading the raw storage data file to the controller, deleting the raw storage data file.

2. The method of claim 1, wherein the distributed storage cluster further includes a plurality of proxy servers, each proxy server coupled to one or more nodes to coordinate access requests with its corresponding nodes, the method further comprising:
for each proxy server, collecting transfer utilization data for the one account by:
creating, at a given proxy server, a rotated log file based on a log file being maintained by the given proxy server, wherein the log file contains entries for each access request processed by the given proxy server;
locating, by the given proxy server periodically searching for, the rotated log file on the given proxy server;
upon the rotated log file being located:
renaming, based on a selected naming scheme, the rotated log file such that the rotated log file becomes a preprocess file;
parsing the preprocess file on the given proxy server to extract raw transfer data, wherein the raw transfer data parsed from the preprocess file are aggregated into aggregated transfer data until the parsing completes;
transferring, from the given proxy server, the raw transfer data to the cluster;

generating, at the given proxy server, an aggregated transfer data file based on the aggregated transfer data;

determining whether both transferring the raw data and generating the aggregated transfer data file are successful;

if both transferring the raw data and generating the aggregated transfer data file are successful, uploading the aggregated transfer data file to the controller until the aggregated transfer data file is successfully uploaded to the controller; and upon successfully uploading the aggregated transfer data file to the controller, deleting the aggregated transfer data file.

3. The method of claim 2, further comprising:

at the controller, generating a cluster account interval (CAI) data for the one account based on the raw storage data file and the aggregated transfer data file, wherein each CAI datum is derived from one record from each of the raw storage data file and the aggregated transfer data file, and wherein the CAI data include storage and transfer utilization data over a predetermined time span.

4. The method of claim 3, further comprising:

at the controller, generating a cluster account interval offset (CAIO) data for the one account based on the raw storage data file and the aggregated transfer data file, wherein the CAIO data has the same predetermined time span as the CAI data but has a different starting time than the CAI data.

5. The method of claim 4, wherein the predetermined time span is one (1) hour, and wherein the starting times for the CAI and CAIO data are offset by half (½) hour.

6. The method of claim 4, wherein each record from the raw storage data file and the aggregated transfer data file only contributes to exactly one CAI datum and one CAIO datum.

7. The method of claim 4, further comprising:

at the controller, tracking (1) an expected count of records in the raw storage data file and the aggregated transfer data file, and (2) an actual processed count of records in the raw storage data file and the aggregated transfer data file.

8. The method of claim 7, further comprising:

generating a table tracking a percent complete value based on the tracking.

9. The method of claim 2, further comprising:

upon successfully receiving the raw storage data file or the aggregated transfer data file, transmitting, by the controller, an acknowledgement for successful receipt.

10. The method of claim 2, further comprising:

at the cluster, storing the raw transfer data transferred from the given proxy server as a backup file.

11. The method of claim 2, wherein the renaming comprises appending a unique suffix to a file name of the rotated log file to create the preprocess file.

12. The method of claim 2, wherein the all available preprocess files have the same prefix in their file names.

13. The method of claim 2, wherein transferring the raw transfer data and parsing the preprocess file on the given proxy server are performed simultaneously.

14. The method of claim 2, wherein parsing the preprocess file on the given proxy server is performed on a per-entry basis.

15. The method of claim 2, wherein the raw transfer data include, for the one account, (1) bytes transferred in from the cluster, and (2) bytes transferred out to the cluster.

16. The method of claim 15, wherein an in-memory aggregation data structure is maintained on a memory of the given proxy server to store the raw transfer data, the method further comprising:

maintaining the in-memory aggregation data structure for the one account by, for a given entry of the raw transfer data:

incrementing a value representing bytes transferred in from the cluster by a first corresponding value parsed out from the given entry;

incrementing a value representing bytes transferred out to the cluster by a second corresponding value parsed out from the given entry; and incrementing a value representing request count by one.

17. The method of claim 2, wherein each entry in the raw transfer data represents one access request.

18. The method of claim 2, wherein internal proxy sub-requests and unparsable lines in the preprocess files are ignored, the unparsable lines being not containing any identifiable values including an account name, a value reflecting an amount of bytes that are received, or a value reflecting an amount of bytes that are sent.

19. The method of claim 1, wherein the storage utilization parameters include a container count, an object count, and bytes used values for the one account.

20. A method for collecting utilization data for a plurality of accounts in a distributed object storage cluster including a controller, a plurality of nodes, each node coupled to a plurality of drives, and a plurality of proxy servers, each proxy server coupled to one or nodes to coordinate access requests with its corresponding nodes, the method comprising:

(1) for each of the nodes, collecting storage utilization data for a one account by:

extracting, at a given node, a plurality of storage utilization parameters recorded under the one account from each of a plurality of account databases that are maintained by a plurality of drives coupled to the given node until all drives coupled to the given node are processed;

generating a raw storage data file based on the plurality of storage utilization parameters extracted at the given node to the raw storage data file;

storing the raw storage data file on the given node;

locating, by periodically searching for, the raw storage data file on the given node; and upon the raw storage data file being located, moving the raw storage data file to the controller, wherein moving the raw storage data file to the controller comprises:

copying the raw storage data file to the cluster until the raw storage data file is successfully copied to the cluster;

upon successfully copying the raw storage data file to the cluster, marking the raw storage data file as copied;

uploading the raw storage data file to the controller until the raw storage data file is successfully uploaded to the controller; and upon successfully uploading the raw storage data file to the controller, deleting the raw storage data file;

(2) for each proxy server, collecting transfer utilization data for the one account by:

creating, at a given proxy server, a rotated log file based on a log file being maintained by the given proxy server, wherein the log file contains entries for each access request processed by the given proxy server;
locating, by periodically searching for, the rotated log file on the given proxy server; and
upon the rotated log file being located, generating and moving an aggregated transfer data file to the controller, wherein the aggregated transfer data file is generated based on the rotated log file; and
(3) at the controller, generating a cluster account interval (CAI) data based on the raw storage data file and the aggregated transfer data file, wherein the CAI data include storage and transfer utilization data over a predetermined time span.

21. The method of 20, wherein generating and moving the aggregated transfer data file to the controller comprises:
renaming, based on a selected naming scheme, the rotated log file such that the rotated log file becomes a preprocess file;
parsing the preprocess file on the given proxy server to extract raw transfer data, wherein the raw transfer data parsed from the preprocess file are aggregated into aggregated transfer data until the parsing completes;
transferring, from the given proxy server, the raw transfer data to the cluster;
generating, at the given proxy server, an aggregated transfer data file based on the aggregated transfer data;
determining whether both transferring the raw data and generating the aggregated transfer data file are successful;
if both transferring the raw data and generating the aggregated transfer data file are successful, uploading the aggregated transfer data file to the controller until the aggregated transfer data file is successfully uploaded to the controller;
upon successfully uploading the aggregated transfer data file to the controller, deleting the aggregated transfer data file.

22. A system for collecting utilization data for a plurality of accounts in a distributed storage cluster, the system comprising a controller and a plurality of nodes, each node coupled to a plurality of drives, wherein:
each of the nodes includes one or more processors configured to collect storage utilization data for a one account by:
extracting, at a given node, a plurality of storage utilization parameters recorded under the one account from each of a plurality of account databases that are maintained by a plurality of drives coupled to the given node until all drives coupled to the given node are processed;
generating a raw storage data file based on the plurality of storage utilization parameters extracted at the given node to the raw storage data file;
storing the raw storage data file on the given node;
locating, by the given node periodically searching for, the raw storage data file on the given node;
upon the raw storage data file being located:
copying the raw storage data file to the cluster until the raw storage data file is successfully copied to the cluster;
upon successfully copying the raw storage data file to the cluster, marking the raw storage data file as copied;
uploading the raw storage data file to the controller until the raw storage data file is successfully uploaded to the controller; and
upon successfully uploading the raw storage data file to the controller, deleting the raw storage data file.

23. The system of claim 22, wherein the distributed storage cluster further includes a plurality of proxy servers, each proxy server coupled to one or more nodes to coordinate access requests with its corresponding nodes, wherein:
each proxy server includes one or more processors configured to collect transfer utilization data for the one account by:
creating, at a given proxy server, a rotated log file based on a log file being maintained by the given proxy server, wherein the log file contains entries for each access request processed by the given proxy server;
locating, by the given proxy server periodically searching for, the rotated log file on the given proxy server;
upon the rotated log file being located:
renaming, based on a selected naming scheme, the rotated log file such that the rotated log file becomes a preprocess file;
parsing the preprocess file on the given proxy server to extract raw transfer data, wherein the raw transfer data parsed from the preprocess file are aggregated into aggregated transfer data until the parsing completes;
transferring, from the given proxy server, the raw transfer data to the cluster;
generating, at the given proxy server, an aggregated transfer data file based on the aggregated transfer data;
determining whether both transferring the raw data and generating the aggregated transfer data file are successful;
if both transferring the raw data and generating the aggregated transfer data file are successful, uploading the aggregated transfer data file to the controller until the aggregated transfer data file is successfully uploaded to the controller; and
upon successfully uploading the aggregated transfer data file to the controller, deleting the aggregated transfer data file.

24. The system of claim 23, wherein the controller includes one or more processors configured to generate a cluster account interval (CAI) data for the one account based on the raw storage data file and the aggregated transfer data file,
wherein each CAI datum is derived from one record from each of the raw storage data file and the aggregated transfer data file, and
wherein the CAI data include storage and transfer utilization data over a predetermined time span.

25. The system of claim 23, wherein each of the nodes is further configured to perform:
deleting the preprocess file if the aggregated transfer data file is generated successfully.

* * * * *